US012337660B2

(12) United States Patent
Durbecq et al.

(10) Patent No.: US 12,337,660 B2
(45) Date of Patent: Jun. 24, 2025

(54) COOLING MODULE FOR AN ELECTRIC OR HYBRID MOTOR VEHICLE

(71) Applicant: VALEO SYSTEMES THERMIQUES, La Verriere (FR)

(72) Inventors: Gael Durbecq, La Verriere (FR); Amrid Mammeri, La Verriere (FR); Erwan Etienne, La Verriere (FR); Kamel Azzouz, La Verriere (FR)

(73) Assignee: VALEO SYSTEMES THERMIQUES, La Verriere (FR)

( * ) Notice: Subject to any disclaimer, the term of this patent is extended or adjusted under 35 U.S.C. 154(b) by 184 days.

(21) Appl. No.: 18/006,699

(22) PCT Filed: Jul. 12, 2021

(86) PCT No.: PCT/EP2021/069358
§ 371 (c)(1),
(2) Date: Jan. 24, 2023

(87) PCT Pub. No.: WO2022/023012
PCT Pub. Date: Feb. 3, 2022

(65) Prior Publication Data
US 2023/0264541 A1 Aug. 24, 2023

(30) Foreign Application Priority Data
Jul. 27, 2020 (FR) ..................................... 2007903

(51) Int. Cl.
*B60H 1/32* (2006.01)
*B60H 1/00* (2006.01)

(52) U.S. Cl.
CPC ....... *B60H 1/3228* (2019.05); *B60H 1/00278* (2013.01); *B60H 1/00392* (2013.01)

(58) Field of Classification Search
CPC ............. B60H 1/3228; B60H 1/00278; B60H 1/00392; B60H 1/32281; B60H 1/32284;
(Continued)

(56) References Cited

U.S. PATENT DOCUMENTS 9,242,527 B2   1/2016  Graaf et al.
10,259,286 B2  4/2019  Janier et al.
(Continued)

FOREIGN PATENT DOCUMENTS

CN   102120412 A   7/2011
CN   102563943 A   7/2012
(Continued)

OTHER PUBLICATIONS

European Patent Office, International Search Report (with English translation) and Written Opinion of corresponding International Application No. PCT/EP2021/069358, dated Oct. 12, 2021.
China Patent Office, First Office Action (with English translation) and Search Report of corresponding Chinese Application No. 202180050846.4, dated Dec. 19, 2024.

*Primary Examiner* — Emmanuel E Duke
(74) *Attorney, Agent, or Firm* — VALEO SYSTEMES THERMIQUES

(57) ABSTRACT

The invention relates to a cooling module for an electric or hybrid vehicle, the cooling module having a housing including an air inlet and an air outlet and within which there are arranged an assembly of heat exchangers and a tangential turbomachine configured so as to generate an air flow passing through the housing from its air inlet to its air outlet and passing through the assembly of heat exchangers. The housing has, on one of its outer lateral faces, a two-fluid heat exchanger in order to allow the exchanges of heat energy between a first heat-transfer fluid circulating in a first circulation loop and a second heat-transfer fluid circulating in a second circulation loop.

9 Claims, 6 Drawing Sheets

(58) Field of Classification Search
CPC .... B60H 1/00385; B60K 11/08; B60K 11/04;
F01P 2005/046; F01P 2050/24; F01P
5/043; F01P 5/06; H01M 2220/00; H01M
10/613; H01M 10/625; H01M 10/6563;
H01M 10/6568; Y02E 60/10
See application file for complete search history.

(56) References Cited

U.S. PATENT DOCUMENTS

| | | |
|---|---|---|
| 11,221,164 B2 | 1/2022 | Marasigan |
| 2005/0115704 A1 * | 6/2005 | Ito ................. B60H 1/00885 |
| | | 62/428 |
| 2011/0139397 A1 | 6/2011 | Haussmann |
| 2018/0272830 A1 | 9/2018 | Vespa |
| 2019/0001807 A1 | 1/2019 | Han et al. |
| 2021/0031588 A1 | 2/2021 | Yahia et al. |

FOREIGN PATENT DOCUMENTS

| | | | | |
|---|---|---|---|---|
| CN | 107074094 A | | 8/2017 | |
| CN | 109154421 A | * | 1/2019 | ................ F17C 9/04 |
| CN | 109791004 A | * | 5/2019 | ......... B60H 1/00921 |
| CN | 111006410 A | | 4/2020 | |
| CN | 210941334 U | | 7/2020 | |
| DE | 112014000625 T5 | * | 11/2015 | ............ B60H 1/2221 |
| FR | 3052109 A1 | | 12/2017 | |
| FR | 3074272 A1 | | 5/2019 | |
| FR | 3077373 B1 | * | 12/2019 | ............. B60H 1/004 |
| WO | WO-2019025705 A1 | * | 2/2019 | ......... B60H 1/00921 |
| WO | WO-2019039990 A1 | * | 2/2019 | ............. B60K 11/04 |
| WO | WO-2020065204 A1 | * | 4/2020 | ............. B60K 11/04 |

\* cited by examiner

COOLING MODULE FOR AN ELECTRIC OR HYBRID MOTOR VEHICLE

TECHNICAL FIELD

The invention relates to a cooling module for an electric or hybrid motor vehicle. The invention also concerns an electric motor vehicle equipped with such a cooling module.

BACKGROUND OF THE INVENTION

A cooling module (or heat exchange module) of a motor vehicle conventionally comprises a set of heat exchangers and a ventilation device which is designed to generate an air flow passing through the set of heat exchangers. The ventilation device thus makes it possible, for example, to generate an air flow passing through the heat exchangers of the set of heat exchangers when the vehicle is stationary.

The heat exchangers within the cooling module are generally stacked in such a way that the same air flow passes successively through the set of heat exchangers. However, in such a stack of heat exchangers, each heat exchanger placed upstream of another in the direction of circulation of the air flow has an impact on the performance of the latter, for example by increasing the temperature of the air flow air passing through it or by increasing the loss of pressure of the air flow.

The heat exchangers of the set of heat exchangers are each connected to a coolant circulation loop, which is configured to allow thermal management of various elements of the electric or hybrid vehicle. Thus, one or more heat exchangers of the cooling module can be connected to a loop allowing thermal management of various components such as the motor and/or the power electronics and/or the on-board charger. One or more other heat exchangers of the cooling module can be, for their part, connected to another loop allowing thermal management of other elements such as the batteries. However, these loops can also include various other heat exchangers and components, which can take up considerable space within the cooling module.

A large number of heat exchangers can also be quite substantial in terms of weight. Thus, the architecture of these heat transfer fluid circulation loops is important in order to allow good thermal management of the various elements while limiting the weight and the volume occupied by their components.

SUMMARY OF THE INVENTION

One of the aims of the invention is to at least partially overcome the drawbacks of the prior art and to propose an improved cooling module for an electric motor vehicle.

To this end, the subject matter of the invention is a cooling module for an electric or hybrid motor vehicle, said cooling module including a housing comprising an air inlet and an air outlet, inside which housing are arranged a set of heat exchangers and a tangential-flow turbomachine configured so as to generate an air flow passing through said housing from its air inlet to its air outlet and passing through the set of heat exchangers, the housing comprising, on one of its external lateral faces, a two-fluid heat exchanger configured to allow exchanges of heat energy between a first heat transfer fluid circulating in a first circulation loop and a second heat transfer fluid circulating in a second circulation loop.

Thanks to the location of the two-fluid heat exchanger on the lateral face of the cooling module, the fluidic connections between this two-fluid heat exchanger, the heat exchangers within the housing and the first and second circulation loops are simplified. This arrangement makes it possible to reduce the size of the heat exchange module while making it more lightweight.

The invention can further comprise one or more of the following aspects taken alone or in combination:
 the first circulation loop includes a main loop comprising a first pump, a first heat exchanger of the set of heat exchangers and a thermal management interface arranged at elements to be cooled such as an electric motor and/or power electronics and/or an on-board charger;
 the first circulation loop comprises a branch pipe bypassing the thermal management interface, said branch pipe includes the two-fluid heat exchanger arranged downstream of a second heat exchanger of the set of heat exchangers;
 the first heat exchanger is arranged within the housing downstream of the second heat exchanger in the direction of circulation of the air flow;
 the first and the second heat exchanger are arranged within the housing in such a way that the inlet for the first heat transfer fluid of the first heat exchanger and the outlet for the first heat transfer fluid of the second heat exchanger are arranged on the same lateral face of the housing as the two-fluid heat exchanger;
 the branch pipe of the first circulation loop includes a third heat exchanger of the set of heat exchangers;
 the third heat exchanger is arranged downstream of the second heat exchanger in the direction of circulation of the first heat transfer fluid;
 the third heat exchanger is arranged upstream of the second heat exchanger within the housing in the direction of circulation of the air flow;
 the first and the third heat exchangers are arranged within the housing in such a way that the first heat transfer fluid inlet of the first heat exchanger and the first heat transfer fluid outlet of the third heat exchanger are arranged on the same lateral face of the housing as the two-fluid heat exchanger;
 the second circulation loop is a cooling loop inside which the second heat transfer fluid is a coolant;
 the second circulation loop comprises, in the direction of circulation of the coolant, a compressor, the two-fluid heat exchanger, a first expansion device and a fourth heat exchanger intended to exchange heat energy with the batteries of the electric or hybrid vehicle;
 the fourth heat exchanger is in direct contact with the batteries;
 the fourth heat exchanger is a two-fluid heat exchanger arranged jointly on the second circulation loop and on an additional circulation loop inside which a third heat transfer fluid circulates;
 the additional circulation loop includes a second pump and a second interface for exchange with the batteries;
 the additional circulation loop includes a bypass leg for bypassing the fourth heat exchanger;
 the second circulation loop comprises a branch leg connected in parallel with the first expansion device and the fourth heat exchanger;
 said branch leg includes a second expansion device arranged upstream of an evaporator;
 the dimensions of the two-fluid heat exchanger arranged on the external lateral face of the cooling module are smaller than that of a heat exchanger of the set of heat exchangers;

the two-fluid heat exchanger arranged on the external lateral face of the cooling module is arranged directly below a motor intended to move the tangential-flow turbomachine;

the housing comprises a casing inside which the two-fluid heat exchanger is arranged; and the casing comprises fastening means such as fastening lugs intended to secure the two-fluid heat exchanger to one of its external lateral faces.

BRIEF DESCRIPTION OF DRAWINGS

Further advantages and features of the invention will become more clearly apparent from reading the following description, given by way of illustrative and non-limiting example, and the appended drawings, in which.

DETAILED DESCRIPTION OF THE INVENTION

Figure 1:
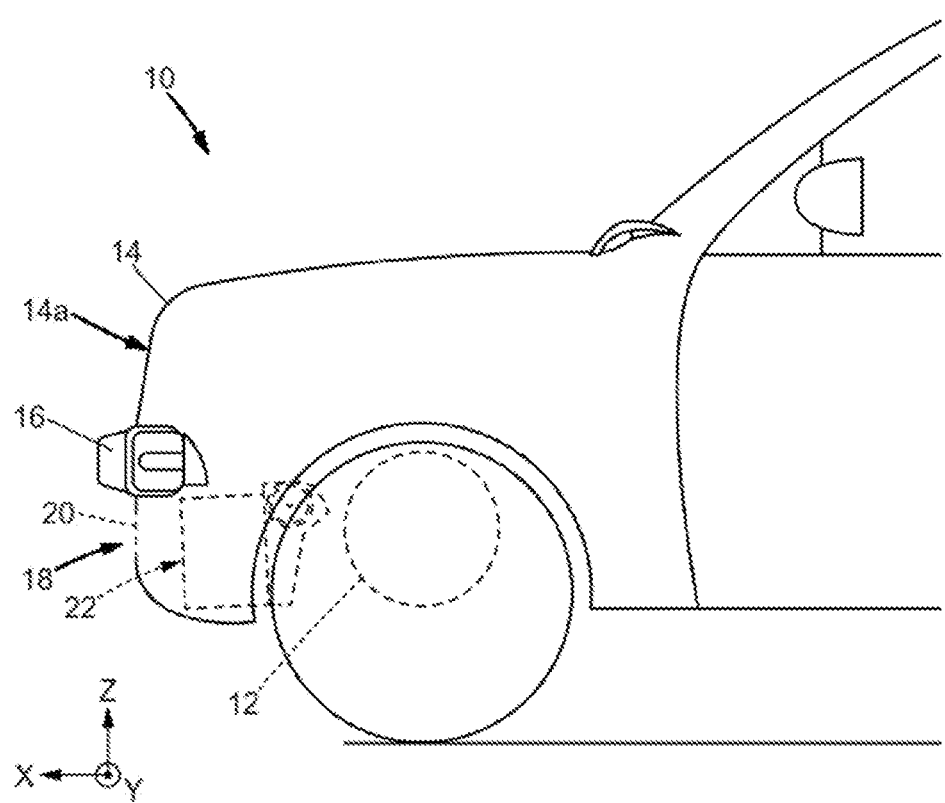
FIG. 1 schematically shows the front part of a motor vehicle with an electric motor, seen from the side.

In these figures, identical elements bear the same reference numerals.

The following embodiments are examples. Although the description refers to one or more embodiments, this does not necessarily mean that each reference relates to the same embodiment, or that the features apply only to a single embodiment. Individual features of various embodiments can also be combined or interchanged to provide other embodiments.

In the description, ordinal numbering can be applied to certain elements, such as first element or second element. In this case, the ordinal number is simply to differentiate and denote elements that are similar but not identical. This ordinal numbering does not imply that one element takes priority over another and such numbering can easily be interchanged without departing from the scope of the present description. Likewise, this ordinal numbering does not imply any chronological order.

In the present description, "placed upstream" means that an element is placed before another relative to the direction of circulation of an air flow. By contrast, "placed downstream" is understood to mean that an element is placed after another relative to the direction of circulation of the air flow.

Figure 2:
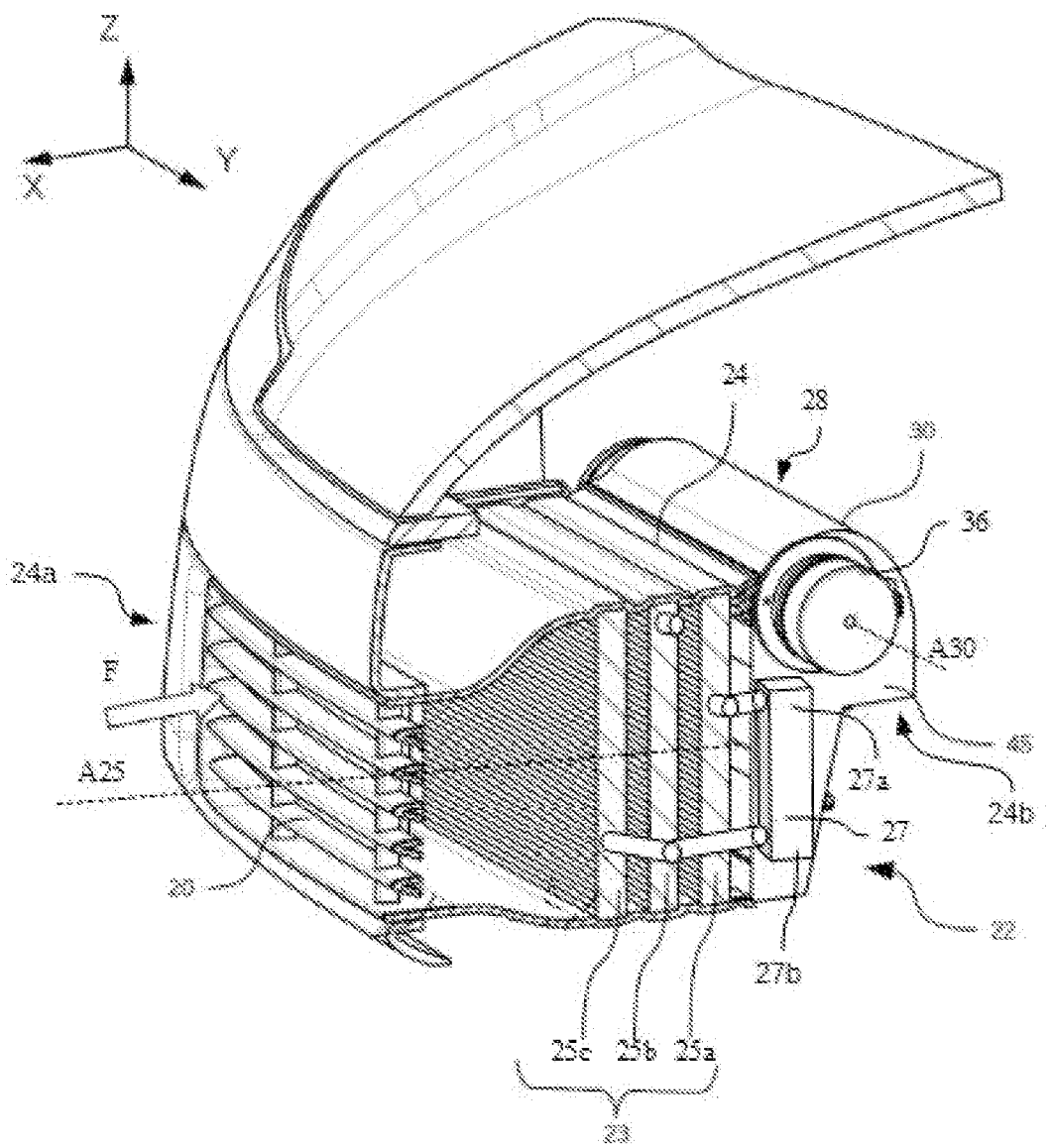
FIG. 2 is a schematic perspective view of a cooling module which can be used in the motor vehicle of FIG. 1, with part of the fairing of the cooling module removed.

In FIGS. 1 and 2, a trihedron XYZ is shown in order to define the orientation of the various elements relative to one another. A first direction, denoted X, corresponds to a longitudinal direction of the vehicle. It also corresponds to the direction of forward movement of the vehicle. A second direction, denoted Y, is a lateral or transverse direction. Finally, a third direction, denoted Z, is vertical. The directions X, Y, Z are orthogonal in pairs.

In the present description, "lower" means the position of an element relative to another in the direction Z determined above.

FIG. 1 schematically shows the front part of a motor vehicle 10 with an electric motor 12. The vehicle 10 has in particular a body 14 and a fender 16 that are supported by a chassis (not shown) of the motor vehicle 10. The body 14 defines a cooling opening 18, i.e. an opening through the body 14. In this case, there is only one cooling opening 18. This cooling opening 18 is situated in the lower part of the front face 14a of the body 14. In the example illustrated, the cooling opening 18 is situated below the fender 16. A grille 20 can be positioned in the cooling opening 18 to prevent projectiles from being able to pass through the cooling opening 18. A cooling module 22 is positioned facing the cooling opening 18. The grille 20 makes it possible in particular to protect this cooling module 22.

The cooling module 22 is more clearly visible in FIG. 2. As shown in FIG. 2, the cooling module 22 essentially comprises a fairing 24 forming an internal channel between an air inlet 24a and an air outlet 24b. The air inlet 24a is intended to be arranged opposite the cooling opening 18 while the air outlet 24b is located on the opposite side of the cooling module 22. In addition, the cross section of the conduit formed in the housing 24 is significantly greater at the air inlet 24a than at its opposite air outlet 24b.

The housing 24 makes it possible to house a set 23 of heat exchangers 25a, 25b, 25c and the at least one tangential-flow turbomachine 28 which is able to create a first air flow F passing through the set 23 of heat exchangers 25a, 25b, 25c. As shown in FIG. 2, the cooling module 22 is designed to have an air flow F passing through it parallel to the direction X, and going from the front to the rear of the vehicle 10.

The air flow F can undergo an increase in its temperature each time it passes through a heat exchanger 25a, 25b, 25c. Thus, the temperature of the air sucked in at a grille 20 at the front of the vehicle is in particular lower than that expelled at an outlet 45 for the air flow F arranged downstream of the set 23 of heat exchangers 25a, 25b, 25c in the direction of circulation of the air flow.

The heat exchangers 25a, 25b, 25c of this set 23 are for example aligned along a stacking axis A25 which is in particular perpendicular to the axis A30 of the turbine 30 of the tangential-flow turbomachine 28. The heat exchangers 25a, 25b, 25c are arranged one behind the other in the internal channel formed by the housing 24.

In the example of the cooling module 22 shown in FIG. 2, the set 23 of heat exchangers 25a, 25b, 25c comprises a first 25a, a second 25b and a third 25c heat exchangers. It is of course entirely possible to envisage a cooling module 22 comprising only two heat exchangers 25a, 25b or even more than three heat exchangers 25a, 25b, 25c.

The dimensions of the heat exchangers 25a, 25b, 25c can be such that their total height along the axis Z and their extent along the axis Y and their thickness along the axis X are identical or at least similar from one heat exchanger to another, as shown in FIG. 2. In other words, the heat exchangers 25a, 25b, 25c of the set 23 all have for example the same size, which facilitates their stacking within the cooling module 22.

The heat exchanger furthest downstream in the direction of circulation of the first air flow F, in this case the heat exchanger 25a, has a warmer fluid passing through it and is arranged further from the end 24a of the housing 24 than the furthest upstream heat exchanger, in this case the heat exchanger 25c, which has a cooler fluid passing through it. The arrangement of the heat exchangers 25a, 25b, 25c one behind the other in the axial direction X of the cooling module 22 also makes it possible to limit the size of the cooling module 22 in its two other lateral and vertical dimensions.

The tangential-flow turbomachine 28 comprises a turbine 30 which can also be described as a tangential blower-wheel and which is driven in rotation by a motor 36. The turbine 30 has a substantially cylindrical shape and has an axis of rotation A30. Advantageously, this axis of rotation A30 is oriented substantially parallel to the lateral direction Y of the radiators 25a, 25b, 25c, as shown more particularly in FIG. 2.

The motor 36 has for example a substantially cylindrical shape. The motor 36 is located for example on a lateral face of the cooling module 22, the lateral face extending perpendicular to the axis A30 of the tangential-flow turbomachine 28. The cooling module 22 more particularly comprises two lateral faces arranged on either side of the housing 24, these lateral faces are parallel to the plane generated by the axes X and Z.

The housing 24 also comprises, on one of its external lateral faces, a two-fluid heat exchanger 27 configured to allow exchanges of heat energy between a first heat transfer fluid circulating in a first circulation loop C1 and a second heat transfer fluid circulating in a second circulation loop C2.

The two-fluid heat exchanger 27 arranged on the external lateral face of the cooling module 22 is for example arranged directly below the motor 36 intended to move the tangential-flow turbomachine 28, as shown in FIG. 2. This location of the two-fluid heat exchanger 27 is particularly advantageous, since the two-fluid heat exchanger 27 in this case occupies a dead volume located in the same plane as the motor 36. In other words, the location of the two-fluid heat exchanger 27 does not impose any additional constraint as regards the compactness of the cooling module 22, or of the various circulation loops C1 and C2.

Furthermore, due to its particular function, the dimensions of the two-fluid heat exchanger 27 can be smaller than that of a heat exchanger 25a, 25b, 25c of the set 23. Thus, the two-fluid heat exchanger 27 can easily be integrated on the external lateral face of the cooling module 22, in particular directly below the motor 36.

Figure 6:
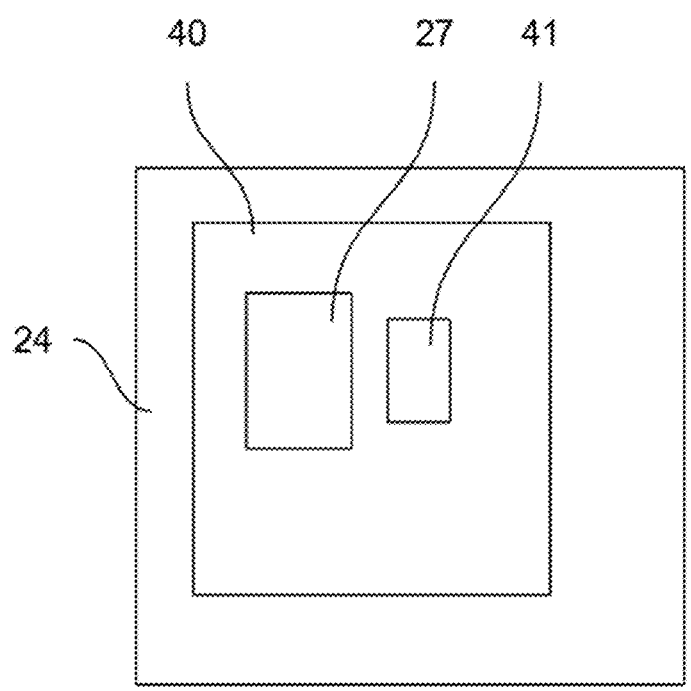
FIG. 6 is a schematic view of the housing with a casing for a heat exchanger.

As shown in FIG. 6, the housing 24 can also comprise a casing 40 inside which the two-fluid heat exchanger 27 is arranged. This casing 40 comprises for example fastening means (fasteners 41) such as fastening lugs intended to secure the two-fluid heat exchanger 27 to one of the external lateral faces of the housing 24 of the cooling module 22.

The two-fluid heat exchanger 27 is configured to allow exchanges of heat energy between a first heat transfer fluid circulating in a first circulation loop C1 and a second heat transfer fluid circulating in a second circulation loop C2. The second circulation loop C2 can more particularly be a cooling loop inside which the second heat transfer fluid is a coolant.

Figure 3:
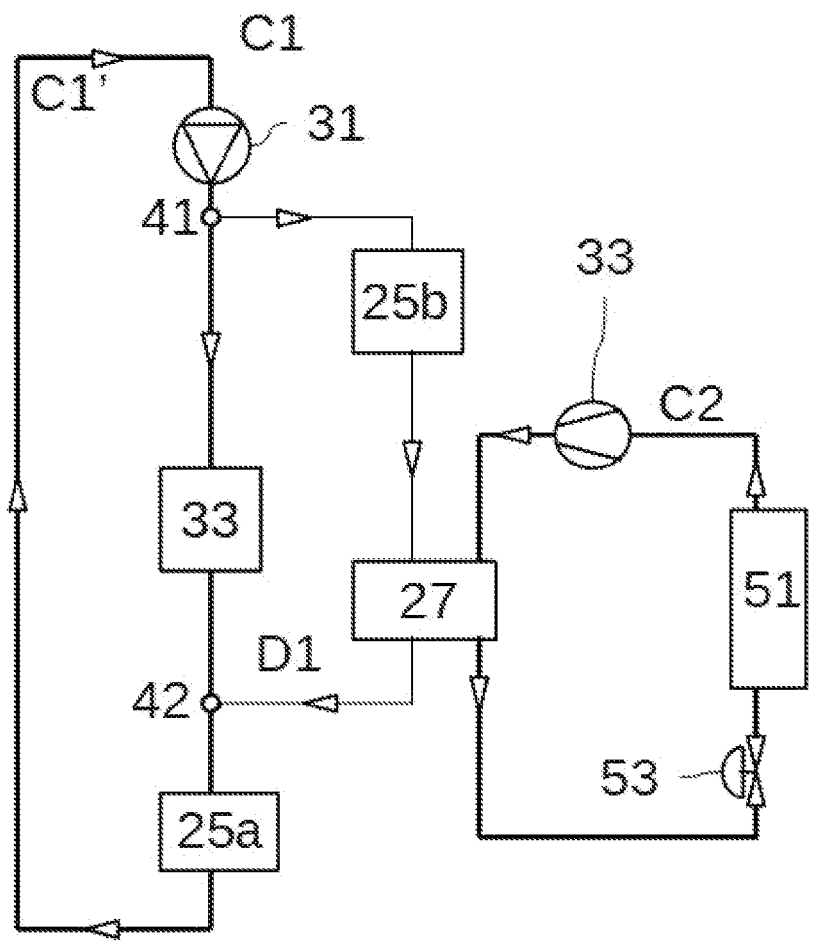
FIG. 3 is a schematic view of a first embodiment of a thermal management circuit.

As shown in FIG. 3, the first circulation loop C1 can in particular include a main loop C1' (shown in bold) comprising a first pump 31, a first heat exchanger 25a of the set 23 and a thermal management interface 33 arranged at elements to be cooled such as the power electronics and/or an on-board charger and/or an electric motor. "Thermal management interface" means more specifically a heat exchanger 33 juxtaposed with the element that is to be cooled. The operating temperature in the electric motor is for example between 55° C. and 70° C.

The first circulation loop C1 also includes a branch pipe D1 bypassing the thermal management interface 33. To this end, the branch pipe D1 more specifically connects a first connection point 41 arranged on the main loop CP upstream of the thermal management interface 33 in the direction of circulation of the first heat transfer fluid, to a second connection point 42 arranged on the main loop C1' downstream of the thermal management interface 33.

The first connection point 41 is in particular in this case arranged between the first pump 31 and the thermal management interface 33. The second connection point 42 is for its part arranged between the thermal management interface 33 and the first heat exchanger 25a. The first connection point 41 is a point of divergence between the first circulation loop C1 and the branch pipe D1 while the second connection point 42 is a point of convergence.

The branch pipe D1 also includes the two-fluid heat exchanger 27 arranged downstream of a second heat exchanger 25b. This second heat exchanger 25b is also a heat exchanger of the set 23 of heat exchangers 25a, 25b, 25c.

The first heat exchanger 25a and the second heat exchanger 25b are both radiators and help dissipate the heat generated in the on-board charger and/or the electronics and/or the electric motor as well as that provided by the two-fluid heat exchanger 27. The second heat exchanger 25b is in particular dedicated to cooling the first heat transfer fluid upstream of the two-fluid heat exchanger 27 in order to allow the first heat transfer fluid to absorb as much heat energy as possible from the second circulation loop C2.

As shown in FIG. 2, the first heat exchanger 25a is preferably arranged within the housing 24 downstream of the second heat exchanger 25b in the direction of circulation of the air flow F.

According to one particular embodiment of the heat exchangers 25a and 25b, they include several passes of first fluid. It can particularly be envisaged that the first 25a and the second 25b heat exchanger are arranged within the housing 24 in such a way that the inlet for the first heat transfer fluid of the first heat exchanger 25a and the outlet for the first heat transfer fluid of the second heat exchanger 25b are arranged on the same lateral face of the housing 24 as the two-fluid heat exchanger 27. This arrangement makes it possible in particular to facilitate the fluidic connections between the two-fluid heat exchanger 27 and the heat exchangers 25a and 25b.

As stated above and as shown in FIG. 3, the second circulation loop C2 can be a cooling loop inside which the second heat transfer fluid is a coolant. The second circulation loop C2 thus comprises, in the direction of circulation of the coolant, a compressor 34, the two-fluid heat exchanger 27, a first expansion device 53 and a fourth heat exchanger 51 intended to exchange heat energy with the batteries of the electric or hybrid vehicle. The operating temperature in the two-fluid heat exchanger 27 is for example between 40° C. and 55° C.

According to a first embodiment of the fourth heat exchanger 51, shown in FIG. 3, this is in direct contact with the batteries.

Figure 4:
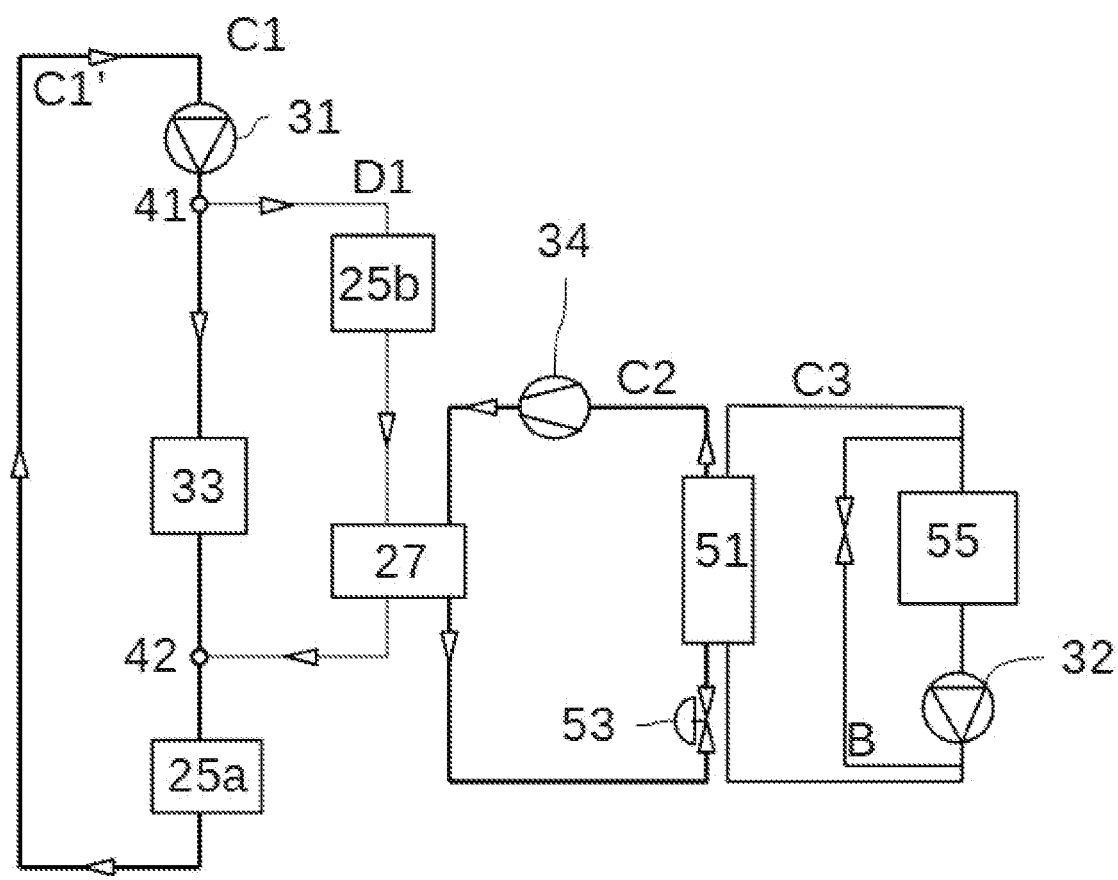
FIG. 4 is a schematic view of a second embodiment of a thermal management circuit.

According to a second embodiment of the fourth heat exchanger 51, shown in FIG. 4, the fourth heat exchanger 51 can be a two-fluid heat exchanger arranged jointly on the second circulation loop C2 and on an additional circulation loop C3 inside which a third heat transfer fluid circulates. In this case, the additional circulation loop C3 includes more particularly a second pump 32 and a second interface for exchange 55 with the batteries.

The additional circulation loop C3 can moreover include a bypass leg B for bypassing the fourth heat exchanger 51.

This bypass leg B makes it possible more particularly to ensure a uniform temperature in the batteries of the electric or hybrid vehicle.

Figure 5:
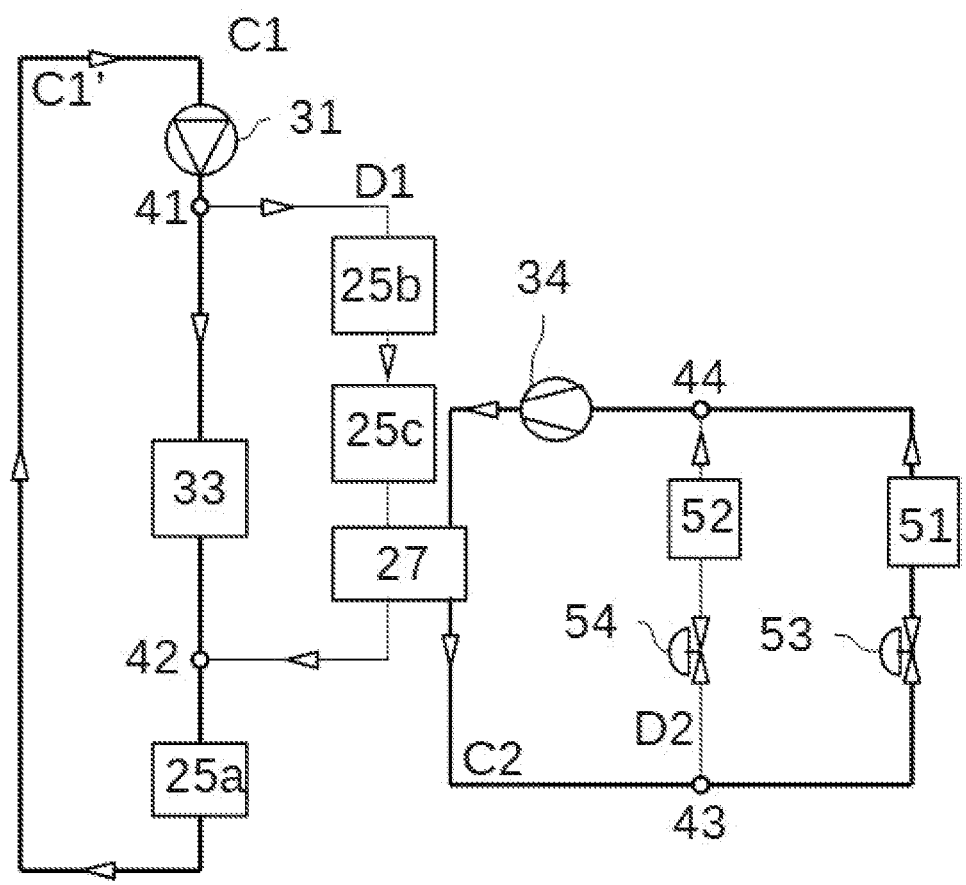
FIG. 5 is a schematic view of a third embodiment of a thermal management circuit.

According to a particular embodiment of the second circulation loop C2 shown in FIG. 5, it can comprise a branch leg D2 connected in parallel with the first expansion device 53 and the fourth heat exchanger 51. The branch leg D2 includes a second expansion device 54 arranged upstream of an evaporator 52. The branch leg D2 is connected to the second circulation loop C2 via a third connection point 43 arranged downstream of the two-fluid heat exchanger 27 and a fourth connection point 44 arranged upstream of the compressor 34.

This evaporator 52 makes it possible in particular to cool the air in the passenger compartment of the motor vehicle, the evaporator 52 is thus an element of an air conditioning circuit arranged within the motor vehicle. This particular embodiment requires greater cooling power than the first embodiment of the second circulation loop C2 described above.

For this purpose, the branch pipe D1 can comprise, in addition to the second heat exchanger 25b, a third heat exchanger 25c of the set 23 of heat exchangers 25a, 25b, 25c. This third heat exchanger 25c is in particular arranged downstream of the second heat exchanger 25b in the direction of circulation of the first heat transfer fluid. More specifically, the third heat exchanger 25c is arranged within the branch pipe D1 between the second heat exchanger 25b and the two-fluid heat exchanger 27.

This third heat exchanger 25c is preferably arranged upstream of the second heat exchanger 25b within the housing 24 in the direction of circulation of the air flow F, as shown in FIG. 2. The presence of a third heat exchanger 25c makes it possible in particular to enlarge the surface area for heat exchange making it possible to dissipate the heat energy from the first heat transfer fluid circulating in the branch pipe D1. In other words, the third heat exchanger 25c makes it possible to increase the cooling power. The second and third heat exchangers 25b and 25c are more particularly intended to cool the first heat transfer fluid upstream of the two-fluid heat exchanger 27.

It is nevertheless entirely possible to envisage an embodiment, not shown, in which the branch pipe D1 comprises a third heat exchanger 25c without this being linked to the presence of a branch leg D2 on the second circulation loop D2.

In the case where the set 23 comprises three heat exchangers 25a, 25b and 25c, the first 25a and the third 25c heat exchangers are for example arranged within the housing 24 in such a way that the first heat transfer fluid inlet of the first heat exchanger 25a and the first heat transfer fluid outlet of the third heat exchanger 25c are arranged on the same lateral face of the housing 24 as the two-fluid heat exchanger 27, as shown in particular in FIG. 2.

The invention is not limited to the exemplary embodiments described with regard to the figures, and further embodiments will become clearly apparent to a person skilled in the art. In particular, the various examples can be combined, provided they are not contradictory.

What is claimed is:

1. A cooling module for an electric or hybrid motor vehicle, said cooling module comprising a housing having an air inlet and an air outlet, wherein inside the housing there are arranged a set of heat exchangers and a tangential-flow turbomachine configured so as to generate an air flow passing through said housing from the air inlet to the air outlet and passing through the set of heat exchangers, wherein the housing includes, on one of its external lateral faces, a two-fluid heat exchanger configured to allow exchanges of heat energy between a first heat transfer fluid circulating in a first circulation loop and a second heat transfer fluid circulating in a second circulation loop, wherein the first circulation loop includes:
   a main loop including a first pump, a first heat exchanger of the set of heat exchangers and a thermal management interface for arranging at elements to be cooled,
   a branch pipe bypassing the thermal management interface, said branch pipe including the two-fluid heat exchanger arranged downstream of a second heat exchanger of the set of heat exchangers.

2. The cooling module as claimed in claim 1, wherein the first heat exchanger is arranged within the housing downstream of the second heat exchanger in the direction of circulation of the air flow.

3. The cooling module as claimed in claim 1, wherein the first and the second heat exchangers are arranged within the housing in such a way that the inlet for the first heat transfer fluid of the first heat exchanger and the outlet for the first heat transfer fluid of the second heat exchanger are arranged on the same lateral face of the housing as the two-fluid heat exchanger.

4. The cooling module as claimed in claim 1, wherein the branch pipe of the first circulation loop includes a third heat exchanger of the set of heat exchangers, this third heat exchanger being arranged downstream of the second heat exchanger in the direction of circulation of the first heat transfer fluid.

5. The cooling module as claimed in claim 4, wherein the third heat exchanger is arranged upstream of the second heat exchanger within the housing in the direction of circulation of the air flow.

6. The cooling module as claimed in claim 1, wherein the second circulation loop is a cooling loop inside which the second heat transfer fluid is a coolant, said second circulation loop including, in the direction of circulation of the coolant, a compressor, the two-fluid heat exchanger, a first expansion device and a fourth heat exchanger intended to exchange heat energy with batteries of the electric or hybrid motor vehicle.

7. The cooling module as claimed in claim 6, wherein the fourth heat exchanger is intended to be in direct contact with the batteries.

8. The cooling module as claimed in claim 6, wherein the second circulation loop includes a branch leg connected in parallel with the first expansion device and the fourth heat exchanger, said branch leg including a second expansion device arranged upstream of an evaporator.

9. The cooling module as claimed in claim 1, wherein the housing includes a casing inside which the two-fluid heat exchanger is arranged and in that the casing includes fasteners such as fastening lugs intended to secure the two-fluid heat exchanger to one of its external lateral faces.

* * * * *